Nov. 29, 1960 W. A. HOHLBEIN 2,961,907
METHOD OF SHEARING LOCKING COLLAR FROM HIGH SHEAR RIVET
Filed March 26, 1956

INVENTOR.
WESLEY A. HOHLBEIN

Reynolds, Beach + Christensen
ATTORNEYS

000
United States Patent Office 2,961,907
Patented Nov. 29, 1960

2,961,907

METHOD OF SHEARING LOCKING COLLAR FROM HIGH SHEAR RIVET

Wesley A. Hohlbein, Seattle, Wash., assignor to Boeing Airplane Company, Seattle, Wash., a corporation of Delaware Filed Mar. 26, 1956, Ser. No. 573,827

1 Claim. (Cl. 83—13)

High shear rivets are employed in aircraft construction at various places, and consist primarily of a rivet, bolt, or like element (hereinafter collectively termed a "rivet") having a shank and a head of material which has high shear strength, and a malleable collar pressed or swaged upon the shank at the end opposite the head, which end protrudes beyond the members to be secured together. Ordinarily this protruding end of the shank is recessed circumferentially inwardly from the shank's diameter, which diameter corresponds closely to the diameter of the holes through which the shank passes in the secured members. This recess is filled and the shank is surrounded by the malleable collar when the latter is swaged into place about the rivet shank. The collar also extends outwardly of the shank's diameter, to bear upon the surface of the secured members opposite the surface which is engaged by the rivet's head. Thereby the collar is locked in place, and prevents withdrawal of the rivet. An example of such a high shear rivet assembly is found in the patent to Wing No. 2,355,579. This Wing patent illustrates a high shear rivet of a type which has been used quite generally in aircraft construction. There are other types of such high shear rivets, but all are of the general type described above.

Whenever in the past it has been necessary to remove such high shear rivets, which are difficult to work because of their inherent nature, it has been the practice to use a cold chisel and to drive the edge of the same radially inwardly against the malleable more easily worked collar until the collar splits. It can then be opened up sufficienty to free the inwardly swaged part from the shank's depression, so that the shear pin or rivet can be driven or withdrawn axially through the collar and so through the hole in the secured members. The use of such a chisel is, however, unsatisfactory for several reasons. For one, the chisel will often slip, marring the surface of the surrounding structure. Moreover, it is difficult to avoid contact between the chisel and the high shear pin, and such contact, with the force of driving the chisel into the collar, will scratch the pin or deform it somewhat, but even if this is minor, it still scores the hole as the rivet pin is driven from the hole, and destroys the uniformity and integrity of the joint between the rivet and the hole. Thus, a large and costly structural part held by such a shear pin may be so injured, simply by the operation of removing the collar from the shear pin and the shear pin from the hole, that the structural part may not be reusable.

It has been the practice also to drive common rivets of malleable material from their holes by punches which cut through a rivet head and into the hole, of about the same diameter as the rivet shank, and so to push the rivet shank through the hole ahead of the punch. An example of this is found in the Rocheville Patent No. 2,409,589. This, however, is objectionable in removing high shear rivets, discussed above, also for a number of reasons. For one, it is difficult to secure such exact registry and alignment between the rivet-removing punch and the holes as to avoid injuring the holes by contact between the punch and the edges of the holes. Furthermore, since this requires the secured structure to resist the very considerable driving force of the rivet-removing punch, operating upon the highly resistant material of the high shear rivet, such structural elements are themselves likely to be deformed by resistance to this force.

It is the object of the present invention to provide a method and a tool for removing high shear rivets, in particular, without the possibility of injury to, or deformation of, the rivet shank or the secured structure, and which is readily workable, and which will leave the high shear rivet capable of reuse if desired.

Figure 5:
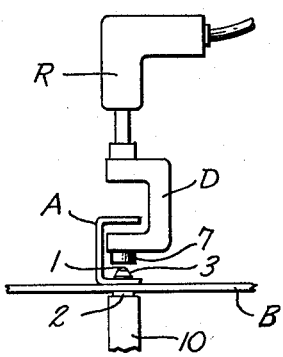
Figure 5 is an elevational view showing how such a tool may be employed with a rivet gun and an adapter in a restricted space.

A and B represent any two or more members which have been secured together by a high shear rivet. The shank 1 of the rivet is shown passing through holes C in the members A and B, and fitting snugly therein, with the rivet head 2 in contact with one face of the secured members and with a swaged head or collar 3 pressed against the opposite face or against a washer 4, which in turn presses against the opposite face of the secured members A and B. The swaged collar and high shear rivet are of the type shown in the Wing patent mentioned above, in which that portion of the shank 1 that projects beyond the secured members, when the head 2 is engaged with the opposite face of such members, is circumferentially recessed, or grooved, as indicated at 5, and the collar 3 has been swaged inwardly into and fills this recess; the collar also spreads outwardly beyond the shank, particularly at the end nearest the washer 4.

As will be obvious, it would be a difficult matter to split the collar 3, notwithstanding that it is made of malleable material, without in some way contacting and scoring or otherwise deforming the shank of the rivet 1, and it would be difficult, also, to split the collar 3 without the likelihood that more or less frequently the chisel would slip and score the member A. Moreover, the application of a splitting force to the collar is likely to produce a moment tending to cock the rivet shank sidewise, which would deform the holes C and so injure seriously the members A and B.

Since the shank 1 was originally inserted in the hole C by passing it through that hole from the underside to the upper side, in the orientation shown, it is clear that all parts of the shank are of a size no larger than the diameter of the hole 3. Nor is this changed by the swaging operation, for the rivet is of high shear steel, or similar metal, difficult to deform, and only the collar 3 is deformed by the swaging operation. Were it not for the inward swaging of the collar material into the depression 5, the rivet might slip easily out of the hole C. Nevertheless, it is entirely impracticable to drive the rivet out in the manner suggested in the Rocheville patent above, for the swaged collar 3 is intended to resist just such stresses, and the attempt would, in all probability, deform the secured members A and B.

According to the present invention, a die 7, which may be mounted in a riveting gun R, either directly or through an adapter D, is provided at one face with a recess 8 of a diameter to fit snugly the shank 1 of the rivet. In other words, the recess 8 is of a diameter closely approximating the diameter of the hole C. The recess 8 is of a depth at least equal to the height of the rivet above the washer 4. In addition, the lip 9 of the die, surrounding the entrance to the recess 8, is of a formation to shear the collar material, and preferably to spread sheared material outwardly.

The tool is completed by a bucking bar 10 or the like, which can be applied ot the head 2 of the rivet to resist the axial driving force applied to the die 7.

When a rivet is to be removed, the die 7 is applied in such manner to the rivet's end that its recess 8 is axially aligned with the rivet's shank. Since the tip of the shank is exposed, in the Wing rivet, and is of full diameter, such alignment is readily effected. This will allow all portions of the shank to pass within, but to fit snugly within, the recess 8. A force or repeated forces are applied to the die 7, by the riveting gun R or the like, while the bucking bar 10 backs up the rivet head 2, and the lip 9 cuts into the collar 3, shearing the malleable material about the lip's diameter, but not acting to deform any part of the rivet, and urging outwardly all material exteriorly of that diameter, as indicated at 3a in Figure 2, until finally the lip 9 contacts the washer 4. All parts of the collar 3 which exceed the diameter of the lip 9 and which, hence, exceed the full diameter of the shank 11, have now been sheared from the portion which equals or is less than the lip's diameter. All the originally inwardly swaged part lies within the depression 5. The excess lies as a flattened ring 3b; see Figure 2. Now, there is left a rivet shank with a small portion of the swaged metal within its depression 5, leaving the rivet shank of full diameter throughout its length, and a completely separate ring 3b which does not, in any way, impede the withdrawal of the rivet shank from its hole C. The die 7 is withdrawn, as is the bucking tool 10, and the rivet can now be pulled or pushed from the hole C. The excess 3b falls clear. The rivet itself it in no wise deformed by this procedure, and can be reused, after removal of the material from within its depression 5. The collar 3, of course, is destroyed but a new collar can be applied to the rivet after the same is put again into use.

Figure 1:
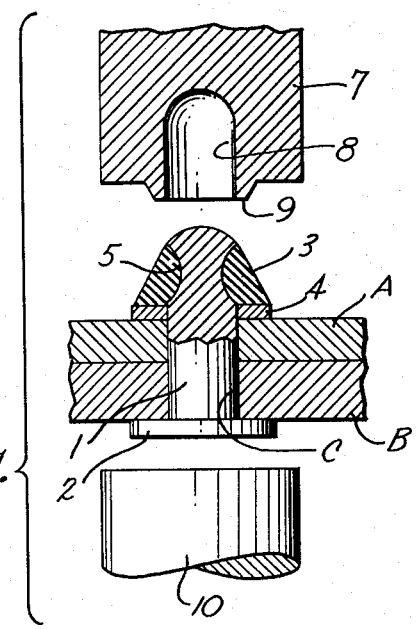
Figure 1 illustrates the several operative elements of the tool in relationship to a rivet which is to be freed and removed, but with the parts not yet in engagement. The figure is an axial section through the collar-shearing die and the rivet and associated parts.
Figure 2:
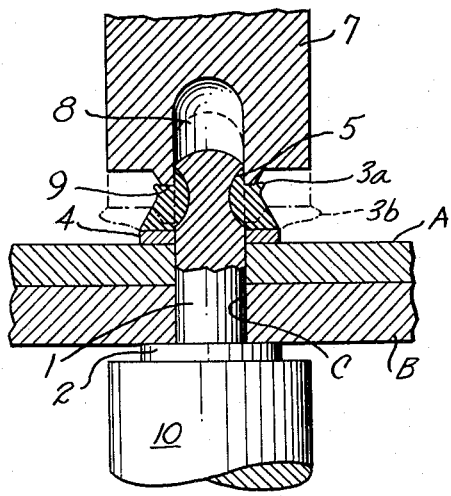
Figure 2 is a view similar to Figure 1, but showing the operation of removing the collar, in order to enable removal of the rivet, partially completed, and, in dot-dash lines, almost completed.
Figure 3:
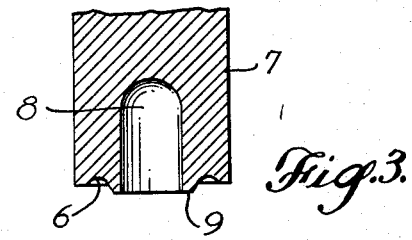
Figure 3 is an axial sectional view of the punch portion of the tool, showing a somewhat modified lip form.
Figure 4:
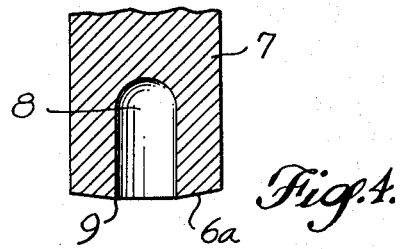
Figure 4 is a view similar to Figure 3, showing a still further modified lip form.

The form which the lip 9 takes may be varied to suit conditions. In Figures 1 and 2, it has been shown somewhat protruding but flattened; in Figure 3, it is shown narrower and surrounded by a groove 6, which will tend to deflect outwardly the sheared-off metal of the collar. In Figure 4, the lip is a sharp edge, and the end of the die 7 surrounding this lip is inclined outwardly, as indicated at 6a, also for the purpose of directing outwardly the sheared-off metal of the collar.

As can be seen in Figure 5, the present invention may be employed in spaces where it is difficult to work, as for instance, between a member A in the form of a channel, and a member B in the form of a plate or sheet atached to the same. The adapter D readily enables the driving force to be applied to the die 7 to shear off the material of the collar which is exterior to the diameter of the rivet's shank.

I claim as my invention:

A method of removing a swaged collar from a high shear rivet or the like which protrudes beyond workpieces having holes snugly receiving the rivet shank, which shank, in its protruding portion, is necked down to define a circumferential depression whereinto a part of the collar has been swaged, the remaining part of the collar surrounding the rivet shank and the inwardly swaged part and bearing upon the workpieces, which method comprises applying a force to and directed axially of the collar, in a circle closely surrounding the shank and of the same diameter, such force having a shearing action to separate the inwardly swaged part from the surrounding part of the collar and an outward forcing action upon the sheared-off surrounding part, meanwhile supporting the rivet against axial movement, whereby to strip off the entire surrounding portion of the collar, and to leave the rivet shank with its depression filled with the inwardly swaged part, flush throughout the shank's length, and of a size for withdrawal through the rivet holes.

References Cited in the file of this patent

UNITED STATES PATENTS

| Number | Name | Date |
|---|---|---|
| 166,337 | Brown | Aug. 3, 1875 |
| 349,388 | Fowler | Sept. 21, 1886 |
| 1,102,162 | Norman | June 30, 1914 |
| 1,160,889 | Healy | Nov. 16, 1915 |
| 1,350,241 | Routh | Aug. 17, 1920 |
| 1,360,618 | Brunelle | Nov. 30, 1920 |
| 1,361,568 | Donaldson | Dec. 7, 1920 |
| 1,764,082 | Lewis | June 17, 1930 |
| 1,821,152 | Gookin | Sept. 1, 1931 |
| 1,848,947 | Gray | Mar. 8, 1932 |
| 1,978,051 | MacDonald | Oct. 23, 1934 |
| 2,122,368 | Engler | June 28, 1938 |
| 2,395,667 | Keller et al. | Feb. 26, 1946 |
| 2,407,904 | Rosan | Sept. 17, 1946 |
| 2,530,399 | Pilgrim | Nov. 21, 1950 |
| 2,565,274 | Simpson | Aug. 11, 1951 |
| 2,617,174 | Knuuti | Nov. 11, 1952 |
| 2,679,680 | Hanks | June 1, 1954 |
| 2,688,185 | Brazil et al. | Sept. 7, 1954 |
| 2,693,025 | Driscoll | Nov. 2, 1954 |
| 2,746,547 | Jenkins et al. | May 22, 1956 |